May 28, 1968  E. R. LIPOR  3,385,950
ELECTRODE TYPE BOTTLE WARMER HAVING TIME-CONTROLLED OPERATION
Filed Oct. 4, 1965
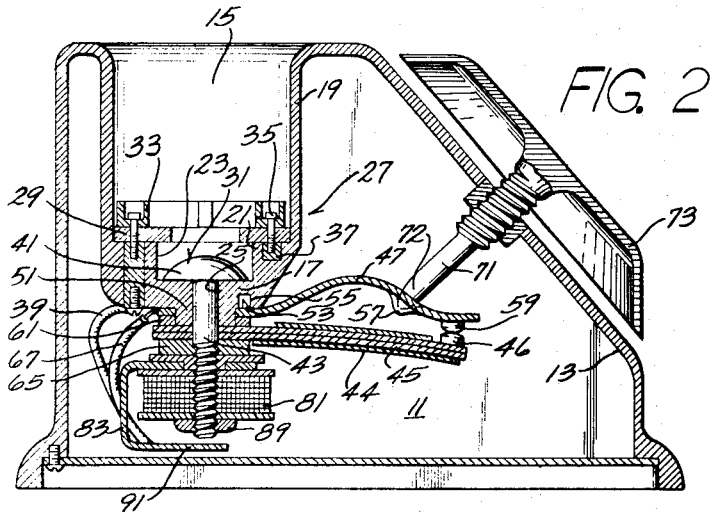
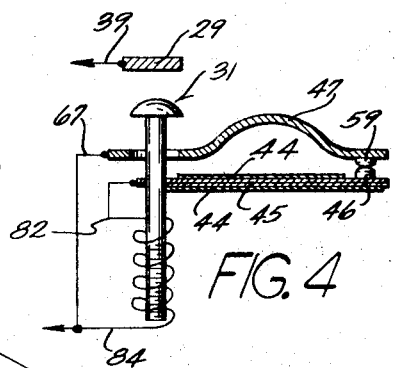
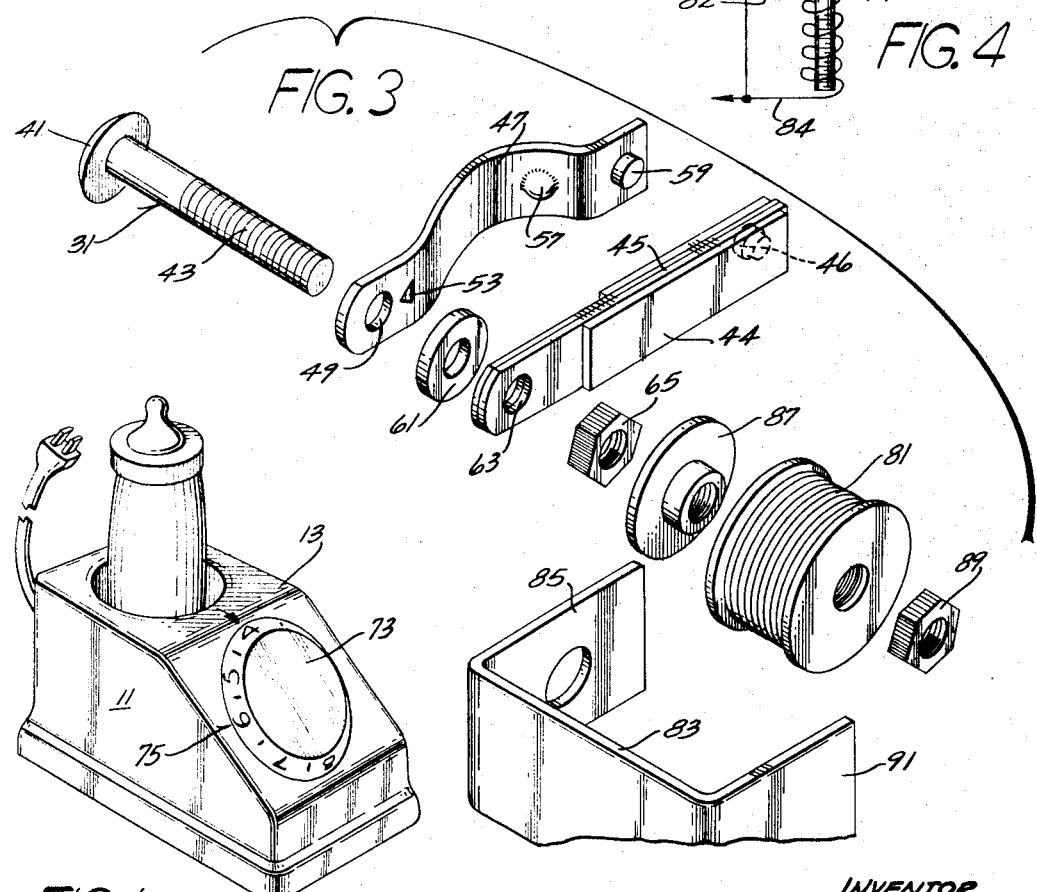
INVENTOR
EDWARD R. LIPOR
BY Wheeler, Wheeler & Wheeler
ATTORNEYS

United States Patent Office 3,385,950
Patented May 28, 1968

3,385,950
ELECTRODE TYPE BOTTLE WARMER HAVING
TIME-CONTROLLED OPERATION
Edward R. Lipor, 6160 S. 6th St.,
Milwaukee, Wis. 53221
Filed Oct. 4, 1965, Ser. No. 492,556
8 Claims. (Cl. 219—295)

ABSTRACT OF THE DISCLOSURE

A bottle warmer wherein heat is produced by electric current passing through water bridging a pair of electrodes at the bottom of the bottle receiving receptacle of the warmer. An adjustable timer comprising a thermally responsive switch mounted in heat exchange with one of the electrodes and operative to break the circuit to the electrodes after a predetermined amount of heat has been transferred from the electrode to the switch is provided for selectively timing the heating interval independently of the quantity or the conductivity of the water bridging the electrodes. Audible alarm means is provided to signal termination of the heating period.

---

The invention relates to bottle warmers utilizing a liquid conductor, usually water, electrically connecting separated electrodes across which an electric current is allowed to pass.

The electric bottle warmer has become an indispensible item among many modern mothers with infants. The common method of operation is to place a measured quantity of water within an insulated vessel having separated electrodes. The electrodes are connected to a source of electrical power. The electrical resistance offered by the water to the electrical current produces an increase of temperature within the water. This heating results in heat transfer to any object placed within the vessel. The heating terminates when the liquid electrically joining the separated electrodes has evaporated. Thus, the apparatus has an inherent timed period of operation.

Since the electrical resistance of water depends upon dissolved minerals, it is at once apparent that water obtained from various localities will vary in mineral content and therefore in electrical resistance. Water containing a great deal of dissolved minerals will have a lower electrical resistance than water of a purer grade and will therefore allow greater electrical current to pass, resulting in a more vigorous boiling. No increase in temperature beyond approximately 100 degrees centigrade will occur regardless of the rate of boiling. Water containing a high concentration of minerals will be converted to vapor at a greater rate than purer water. As a consequence, use of purer water provides a longer period of operation and consequently a high temperature is obtained in the medium as compared to when less pure water is used.

Another objection is that any minerals present within the fluid used between the electrodes will tend to accumulate upon the electrodes and the interior walls of the vessel. This accumulation of mineral deposit is redissolved whenever the apparatus is put into operation and will eventually effect the liquid electrical resistance as mentioned above. The net result of the above mentioned objections produces a situation where the duration of heating varies.

A principal object of the invention is to provide a heating device, such as a bottle warmer, with means for selectively timing the heating interval and means for indicating timing interval termination.

Another principal object of the present invention is to provide an inexpensive new and useful liquid heating device with means for obtaining a desired fluid temperature within a medium to be heated, such as the milk in a baby's bottle, by selecting upon a dial the known amount of the medium or fluid to be heated and with means for indicating by an audible alarm or signal when the desired temperature in the medium has been reached.

Another object of the invention is to provide means for reducing electrical arcing between slowly separating contacts.

Still another object of the invention is to provide an insulated bottle support within the heating chamber which also protects the electrodes from physical damage.

Other objects, advantages, and features of the invention will become known by reference to the following description and the accompanying drawings in which:

FIGURE 1 is a perspective view of a baby bottle warmer embodying various of the features of the invention;

FIGURE 2 is a sectional side elevational view of the device shown in FIGURE 1;

FIGURE 3 is an exploded perspective view of a portion of the device shown in FIGURE 2; and FIGURE 4 is a schematic wiring diagram illustrating the circuit embodied in the device shown in FIGURE 2.

Shown in the drawings is a heating device 11 including support means in the form of a housing 13 which can be made of any material of substantial physical strength and which has good heat resisting and electrical insulating qualities. The housing 13 contains a heating chamber or receptacle 15 which has a bottom wall 17 and two inner annular walls of different diameters. The larger diameter wall 19 extends the greater part of the heating chamber 15 and then joins a circular ledge 21. In turn, the circular ledge 21 extends slightly toward the center of the chamber and then joins a smaller diameter annular wall 23 which connects with the bottom wall 17. The bottom wall 17 is apertured at 25 to receive portions of an electrode heating device 27 comprising first and second electrodes 29 and 31, respectively. The first electrode 29 is mounted in the heating chamber 15 on the circular ledge 21 and is fixed by a series of screws 35 which pass through and secure a bottle supporting bracket 33 and the first electrode 29, by being threaded into inserts 37 in the housing material. One of the inserts is of electrical conducting material and has attached thereto a lead 39 by which the first electrode can be connected to line current.

The second electrode 31 can take various forms and, in the illustrated construction, is in the form of a bolt which is made of a material having good electrical and heat conduction qualities. As will be seen, it is also desirable that the bolt electrode be of a material which will carry magnetic lines of flux. The second or bolt electrode 31 includes a head 41 located in the chamber 15 and a shank 43 extending through the aperture 25. The bolt electrode 31 serves several purposes, including acting as one of the two electrodes used to complete the electrical heating circuit and acting to transfer heat by conduction from the liquid to a bi-metallic contact blade or leaf 45 which is carried on the shank 43, which is covered by a thin layer 44 of flexible insulating material, such as asbestos, to reduce heat loss to the surrounding air currents, and which includes a contact portion 46 adapted to electrically engage a resilient contact blade or leaf 47 to afford current flow between the leaves 45 and 47.

More particularly, the resilient leaf 47 is supported by the housing 13 and includes a bore 49 which is fitted over a depending boss 51 on the bottom wall 17. In order to prevent lateral angular movement of the resilient leaf, the leaf includes a tang 53 which is received into a recess 55 in the bottom wall 17. The resilient leaf 47 is arcuately formed, as shown, and includes a depression 57 for purposes still to be described. At its outer end, the resilient leaf 47 includes a contact portion 59 which, under normal room temperatures, is electrically connected with contact portion 46. The resilient leaf is maintained around the boss 51 with the tang 53 in the recess 55 by an insulating washer 61 which is also engaged by the bi-metallic leaf 45.

The bi-metallic leaf 45 includes a bore 63 which is fitted over the shank 43 and is retained in place on the shank, while also maintaining the resilient leaf 47 in proper place by means in the form of a nut 65 which also serves to provide electrical and heat transmitting connection between the bi-metallic leaf 45 and the electrode bolt 31. In order to complete a circuit through the electrode 31 when the resilient leaf 47 and bi-metallic leaf 45 are electrically connected, the resilient leaf is connected to a lead 67 adapted to be connected to line current.

In operation, the head 41 of the bolt electrode 31 is subject to a constant temperature of about 100 degrees centigrade during boiling of the water in the heating chamber. This heat is transmitted through the bolt electrode 31 to the bi-metallic leaf 45 to effect bending thereof in the direction away from the resilient leaf 47 so as to eventually electrically disconnect the contact portions 46 and 59 thereby interrupting current flow in the bolt electrode 31 through the leaves 45 and 47.

One of the features of the invention resides in the provision of means for selectively biasing the resilient leaf 47 toward the bi-metallic leaf 45 so as to vary the amount of bi-metallic leaf bending required to separate the contact portions 46 and 59 and thereby break the electrical connection between the resilient and bi-metallic leaves. In the disclosed construction, this means is in the form of a screw 71 which is threaded into the housing 13 and which has an end 72 received in the previously mentioned depression 57 in the resilient leaf 47. Carried by the screw is a knob or dial 73 which facilitates rotation of the screw 71. Such rotation results in movement of the screw 71 relative to the housing 13 and serves to vary the amount of bias of the resilient leaf 47 toward the bi-metallic leaf 45.

Because the heat in the bolt electrode 31 is subejct to a consistent temperature during boiling, i.e., to a temperature of 100 degrees centigrade, the amount of bending which takes place in the bi-metallic leaf is a function of time, i.e., the time required for heat transmission from the electrode head 41 to the bi-metallic leaf 45. Moreover, as the screw 71 can be employed to determine when electrical disconnection of the leaves 45 and 47 will take place in terms of the amount of bending of the bi-metallic leaf, the dial 73 can be calibrated in time intervals as shown at 75.

Baby bottles are desirably heated to a given temperature regardless of the quantity of milk in the bottles. Because of the generally constant temperature of boiling water, the time required to heat various quantities of milk is generally in direct proportion to the quantity to be heated. Therefore, the dial 73 can also be calibrated in terms of liquid quantities if desired.

Means are provided for preventing arcing during separation of the contact portions 46 and 59 and for signalling the operator when the circuit through the leaves 45 and 47 is interrupted by separation of the contact portions 46 and 59.

In the disclosed construction, such means is in the form of an electromagnetic coil 81 which is electrically connected through leads 82 and 84 in parallel with the contact portions 46 and 59 and which has associated therewith an armature 83 which creates a buzzing sound in response to sufficient current flow through the coil 81. Normally, there is no buzzing sound because the resistance to current flow through the leaves 45 and 47 is sufficiently less than that afforded by the coil 81 so that only a small amount of current travels through the coil 81. However, upon separation of the contact portions 46 and 59, current flow in the coil increases to set the armature 83 in motion and cause the creation of the buzzing sound. Of course, the coil 81 could be used in a relay to operate a switch and various kinds of signals could be used.

While various arrangements can be employed, in the disclosed construction, the coil 81 is mounted on the lower part of the bolt electrode shank 43 and the armature 83 is of U-shape, having one end 85 apertured so as to fit on the shank 43. In assembly, an insulating washer 87 is first slid over the shank 43, followed by the apertured end 85 of the armature 83, and then the coil 81. A nut 89 is then employed to retain the washer 87, armature 83, and coil 81 on the shank 43. The other end 91 of the armature 83 is in slightly spaced relation from the free end of the electrode bolt shank 43 and engages this end to create the buzzing sound upon sufficient current flow through the coil 81. Thus, the bolt electrode 31 serves as a magnetic pole and as a supporting member, in addition to its already described functions of carrying current and transmitting heat.

Various of the features of the invention are set forth in the following claims.

What is claimed is:

1. An article warmer comprising a housing including a receptacle for an article to be warmed, an electrode heating device in said receptacle including first and second electrodes, said first electrode being adapted to be connected to line current, a resilient leaf adapted to be connected to line current, carried on said housing, and having a contact portion, a bi-metallic leaf mounted on said housing in heat transferring and electrical connection with said second electrode and including a contact portion disposed for electrical connection with said resilient leaf contact portion when said bi-metallic leaf is cool and for disconnection from said resilient leaf contact portion upon heating of said bi-metallic leaf, and means for selectively timing the duration of electrical connection of said leaves after connection of said first electrode and said resilient leaf to line current.

2. A heating device comprising a housing including a receptacle for an article to be warmed, an electrode heating device in said receptacle including first and second electrodes, said first electrode being adapted to be connected to line current, a bi-metallic leaf in heat transferring and electrical connection with said second electrode, a resilient leaf adapted to be connected to line current and supported by said housing for electrical connection with said bi-metallic leaf when said bi-metallic leaf is cool, an electromagnetic coil electrically connected to said resilient leaf and to said second electrode in parallel with the electrical connection of said resilient leaf and said bi-metallic leaf, an armature actuatable by said coil to create a buzzing sound in response to current flow in said coil resulting from electrical disconnection of said bi-metallic leaf from said resilient leaf in response to bending of said bi-metallic leaf incident to heating thereof, and means on said housing for biasing said resilient leaf toward said bi-metallic leaf to vary the amount of bi-metallic bending and thereby the time required to electrically disconnect said bi-metallic leaf from said resilient leaf.

3. A baby bottle warmer comprising a housing including a receptacle for a bottle to be warmed, an electrode heating device at the bottom of said receptacle including first and second electrodes, said first electrode being adapted to be connected to line current, and said second electrode having a threaded shank extending therefrom, a bi-metallic leaf mounted on said shank in heat transferring and electrical connection with said second electrode and including a contact portion, a resilient leaf adapted to be connected to line current and carried on said housing in electrically insulated relation to said shank, said leaf having a contact portion disposed for electrical connection with said bi-metallic leaf contact portion when said bi-metallic leaf is cool, an electromagnetic coil mounted on said shank in electrically insulated relation to said shank, and electrically connected to said resilient leaf and to said second electrode in parallel with the electrical connection of said resilient leaf and said bi-metallic leaf, a U-shaped armature actuatable by said coil to create a buzzing sound in response to current flow in said coil resulting from electrical disconnection of said bi-metallic leaf from said resilient leaf, said armature having a pair of spaced legs, one of said legs extending on one side of said coil and being connected to said shank and the other of said legs extending on the other side of said coil in spaced relation to the end of said shank, and means on said housing for biasing said resilient leaf toward said bi-metallic leaf to vary the amount of bi-metallic bending required to disconnect said bimetallic leaf from said resilient leaf.

4. A baby bottle warmer comprising a housing including a receptacle for a bottle to be warmed, an electrode heating device at the bottom of said receptacle including first and second electrodes, said first electrode being adapted to be connected to line current, and said second electrode having a threaded shank extending therefrom, a bi-metallic leaf mounted on said shank in heat transferring and electrical connection with said second electrode and including a contact portion, a resilient leaf adapted to be connected to line current and carried on said housing in electrically insulated relation to said shank, said leaf having a contact portion disposed for electrical connection with said bi-metallic leaf contact portion when said bi-metallic leaf is cool, an electromagnetic coil mounted on said shank in electrically insulated relation to said shank, and electrically connected to said resilient leaf and to said second electrode in parallel with the electrical connection of said resilient leaf and said bi-metallic leaf, a U-shaped armature actuatable by said coil to create a buzzing sound in response to current flow in said coil resulting from electrical disconnection of said bi-metallic leaf from said resilient leaf, said armature having a pair of spaced legs, one of said legs extending on one side of said coil and being connected to said shank and the other of said legs extending on the other side of said coil in spaced relation to the end of said shank, a screw carried on said housing and including an end engageable with said resilient leg to regulate, in response to rotation of said screw, the bias of said resilient leaf toward said bi-metallic leaf so as to vary the amount of bi-metallic bending required to disconnect said bi-metallic leaf from said resilient leaf, and a knob for rotating said screw.

5. A heating device comprising a housing including a receptacle for an article to be warmed, an electrode heating device in said receptacle including first and second electrodes, said first electrode being adapted to be connected to line current, a bi-metallic leaf in heat transferring and electrical connection with said second electrode, a resilient leaf adapted to be connected to line current and supported by said housing for electrical connection with said bi-metallic leaf when said bi-metallic leaf is cool, an electromagnetic coil electrically connected to said resilient leaf and to said second electrode in parallel with the electrical connection of said resilient leaf and said bi-metallic leaf, signalling means actuated in response to current flow in said coil resulting from electrical disconnection of said bi-metallic leaf from said resilient leaf in response to bending of said bi-metallic leaf incident to heating thereof, and means on said housing for biasing said resilient leaf toward said bi-metallic leaf to vary the amount of bi-metallic bending and thereby the time required to electrically disconnect said bi-metallic leaf from said resilient leaf.

6. An article warmer comprising a housing including a receptacle for an article to be warmed, an electrode heating device in said receptacle including first and second electrodes, said first electrode being adapted to be connected to line current, a contact member adapted to be connected to line current, carried on said housing and having a contact portion, a bi-metallic leaf mounted on said housing in heat transferring and electrical connection with said second electrode and including a contact portion disposed for electrical connection with said contact portion of said contact member when said bi-metallic leaf is cool and for disconnection of said contact portion of said contact member upon heating of said bi-metallic leaf, and means for selectively timing the duration of electrical connection of said contact portions after connection of said first electrode and said contact member to line current.

7. A heating device comprising a housing including a receptacle for an article to be warmed, an electrode heating device in said receptacle including first and second electrodes, said first electrode being adapted to be connected to line current, a bi-metallic leaf in heat transferring and electrical connection with said second electrode, a contact member adapted to be connected to line current and supported by said housing for electrical connection with said bi-metallic leaf when said bi-metallic leaf is cool, and an electromagnetic coil electrically connected to said contact member and to said second electrode in parallel with the electrical connection of said contact member and said bi-metallic leaf, signalling means actuated in response to current flow in said coil resulting from electrical disconnection of said bi-metallic leaf from said contact member in response to bending of said bi-metallic leaf incident to heating thereof and means on said housing for locating said contact member in contacting relation to said bi-metallic leaf to vary the amount of bi-metallic bending and thereby the time required to electrically disconnect said bi-metallic leaf from said contact member.

8. An article warmer comprising a housing including a receptacle for an article to be warmed, an electrode heating device in said receptacle including first and second electrodes, said first electrode being adapted to be connected to line current and said second electrode having a threaded shank extending therefrom, a bi-metallic leaf mounted on said shank in heat transferring and electrical connection with said second electrode and including a contact portion, a contact member adapted to be connected to line current and carried on said housing in electrically insulated relation to said shank, said contact member having a contact portion disposed for electrical connection with said bi-metallic leaf contact portion when said bi-metallic leaf is cool, an electromagnetic coil mounted on said shank in electrically insulated relation to said shank and electrically connected to said contact member and to said second electrode in parallel with the electrical connection of said contact member and said bi-metallic leaf, an armature actuatable by said coil to create a buzzing sound in response to current flow in said coil resulting from electrical disconnection of said bi-metallic leaf from said contact member, and means on said housing for selectively timing the duration of electrical connection of said bi-metallic leaf and said contact member after connection of said first electrode and said contact member to line current.

References Cited

UNITED STATES PATENTS

| | | | |
|---|---|---|---|
| 1,944,495 | 1/1934 | Collins | 219—289 |
| 2,274,383 | 2/1942 | Rush | 219—295 X |
| 2,509,693 | 5/1950 | Morrison | 219—506 X |
| 2,839,660 | 6/1958 | Davies | 219—337 X |
| 3,294,940 | 12/1966 | Ulanet | 200—138 |

FOREIGN PATENTS 1,312,006  11/1962  France.

RICHARD M. WOOD, *Primary Examiner.*

A. BARTIS, *Examiner.*